United States Patent

[11] 3,577,053

| | | |
|---|---|---|
| [72] | Inventor | Joe H. McGee<br>Charlottesville, Va. |
| [21] | Appl. No. | 799,851 |
| [22] | Filed | Feb. 17, 1969 |
| [45] | Patented | May 4, 1971 |
| [73] | Assignee | Sperry Rand Corporation |

[54] BRUSHLESS DC MOTOR INCLUDING A VARIABLE ATTENUATOR FED COMMUTATOR
3 Claims, 6 Drawing Figs.

[52] U.S. Cl. .................................................... 318/254, 318/138
[51] Int. Cl. ........................................................ H02k 29/02
[50] Field of Search ............................................ 318/138, 254, 439, 20, 60 (S)

[56] References Cited
UNITED STATES PATENTS

| 3,257,594 | 6/1966 | Weigel | 318/138 |
| 3,280,396 | 10/1966 | Beck et al. | 318/138 |
| 3,353,076 | 11/1967 | Haines | 318/138 |
| 3,453,514 | 7/1969 | Rakes et al. | 318/138 |

Primary Examiner—G. R. Simmons
Attorney—S. C. Yeaton

ABSTRACT: A brushless DC motor includes a cylindrical reflecting member on the rotor. The cylindrical surface of the reflecting member is divided into arcuate sections equal in number to the number of stator coils in the motor, and each having a different level of reflectivity. Light from a stationary source illuminates the adjacent arcuate section and is reflected onto a stationary sensing element. The input to the sensing element is dependent upon the level of reflectivity of the section that happens to be adjacent the light source. A logic circuit directs the output of the sensing element to the particular stator coils corresponding to the intensity of light reaching the sensor at that time.

INVENTOR
JOE H. MCGEE
BY Joseph M. Roehl
ATTORNEY

INVENTOR
JOE H. MC GEE
BY
ATTORNEY

BRUSHLESS DC MOTOR INCLUDING A VARIABLE ATTENUATOR FED COMMUTATOR

BACKGROUND OF THE INVENTION

The invention relates to direct-current motors and more particularly to direct-current motors having a wound stator and a permanent magnet rotor.

Direct-current motors containing a wound stator and a permanent magnet rotor are well known in the art. These "brushless direct-current motors" have found wide application in situations wherein sparking and other problems associated with conventional commutators must be avoided.

In general, prior art motors of this type require elaborate sensing means. Multiple sensors, for instance, are sometimes employed so that a separate sensor is associated with each stator coil. As the rotor revolves, the individual sensors are sequentially actuated and the appropriate stator coils are sequentially energized to maintain rotation. Multiple sensors, however, necessitate bulky and complex circuitry. In applications in which space and weight are limited, this bulk and complexity may be prohibitive.

Although some prior art brushless DC motors have been built using a single sensor, the use of these device is limited in that the proper phase and sequence cannot be assured at a start-up. The initial torque may cause the device to rotate in the wrong direction.

SUMMARY OF THE INVENTION

Motors constructed according to the principles of the present invention use a single stationary sensor to detect energy propagating from an arcuate section of the rotor adjacent the sensor. Each section provides a different energy level. The output of the sensor is directed to a given stator winding corresponding to the level of energy reaching the sensor.

DESCRIPTION OF THE PREFERRED EMBODIMENT

Figure 1:
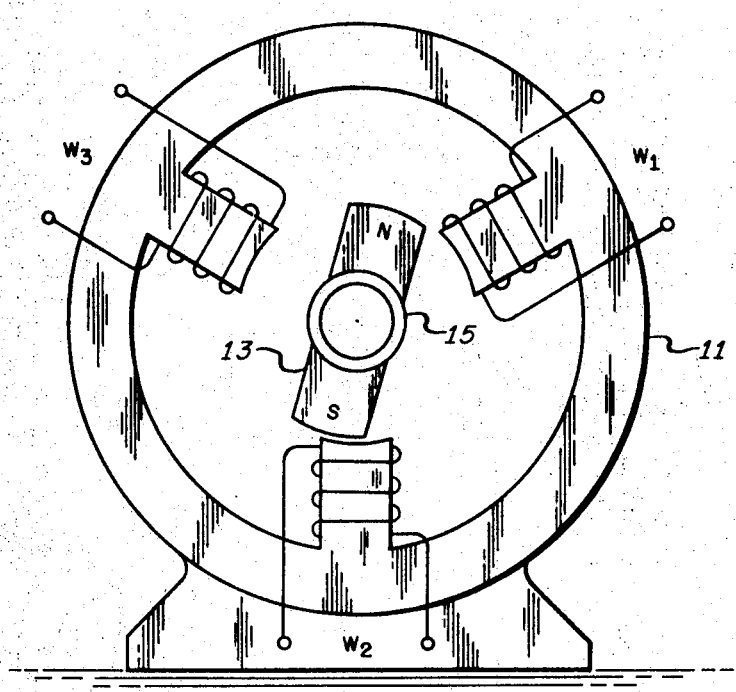
FIG. 1 is a schematic diagram illustrating a transverse section of a motor employing the invention.

Referring now to FIG. 1, a motor constructed according to the principles of the present invention includes a frame member 11 supporting three stator coils $W_1$, $W_2$ and $W_3$. A permanent magnet rotor 13 is mounted coaxially within the frame 11 and contains a permanent magnet member containing north and south magnetic poles as indicated. A cylindrical attenuating member 15 is mounted adjacent the rotor 13 so as to rotate with the rotor. Each stator coil is wound so as to attract the same magnetic pole when energized.

Figure 2:
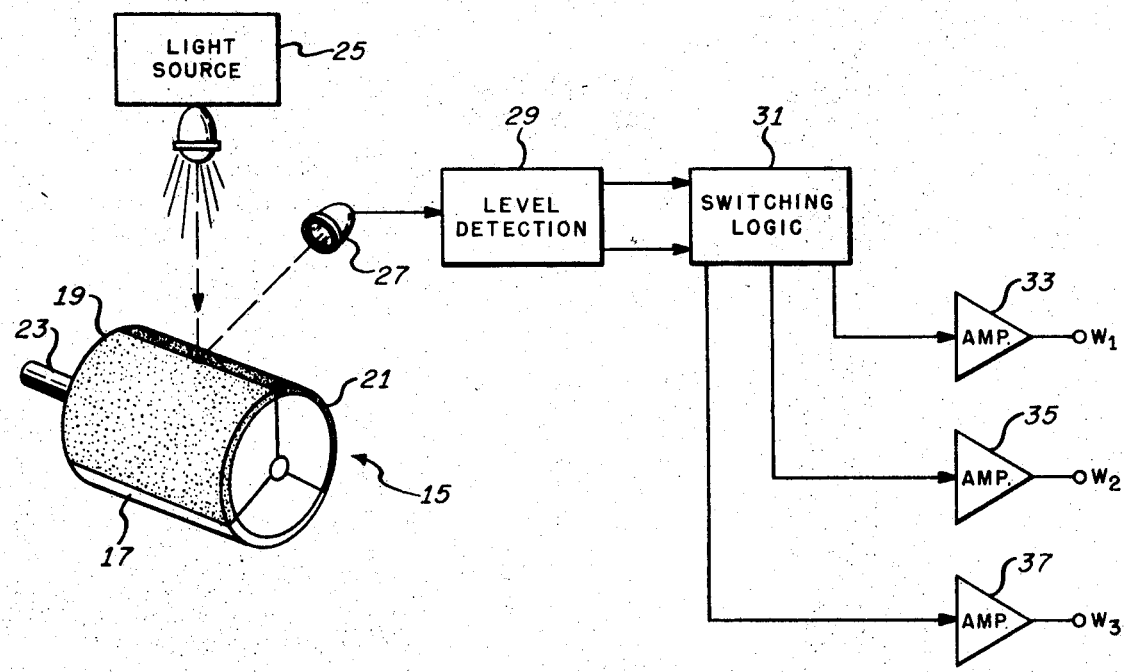
FIG. 2 is a diagram, partly in perspective, useful in explaining the invention.

The operation of this motor can be understood by referring to the diagram of FIG. 2. The cylindrical attenuating member 15 contains three segments, each having a different light reflectivity. These segments are indicated as a section of high reflectivity 17, a second section of intermediate reflectivity 19, and a third section of low reflectivity 21. Each arcuate section extends through an angle of 120°. The cylindrical attenuator 15 is mounted on a shaft 23 which is also the shaft on which the magnetic rotor is mounted. A source of light 25 is arranged to focus a narrow beam of light on the surface of the attenuator and a photoresponsive sensor 27 is positioned to intercept the reflected beam from the surface of the attenuator.

The reflectivity of each arcuate section is uniform throughout that section, but different from the reflectivity of any other section. These sections thus serve to attenuate the light beam to a level that is characteristic of the position of the rotor.

The electrical output of the sensor is applied to a level detector 29. The level detector produces switching voltages dependent upon the level of the signal from the sensor 27. These switching voltages then actuate a logic circuit 31 so as to energize the appropriate winding $W_1$, $W_2$, or $W_3$ through an amplifier 33, 35, 37, respectively.

Figure 3:
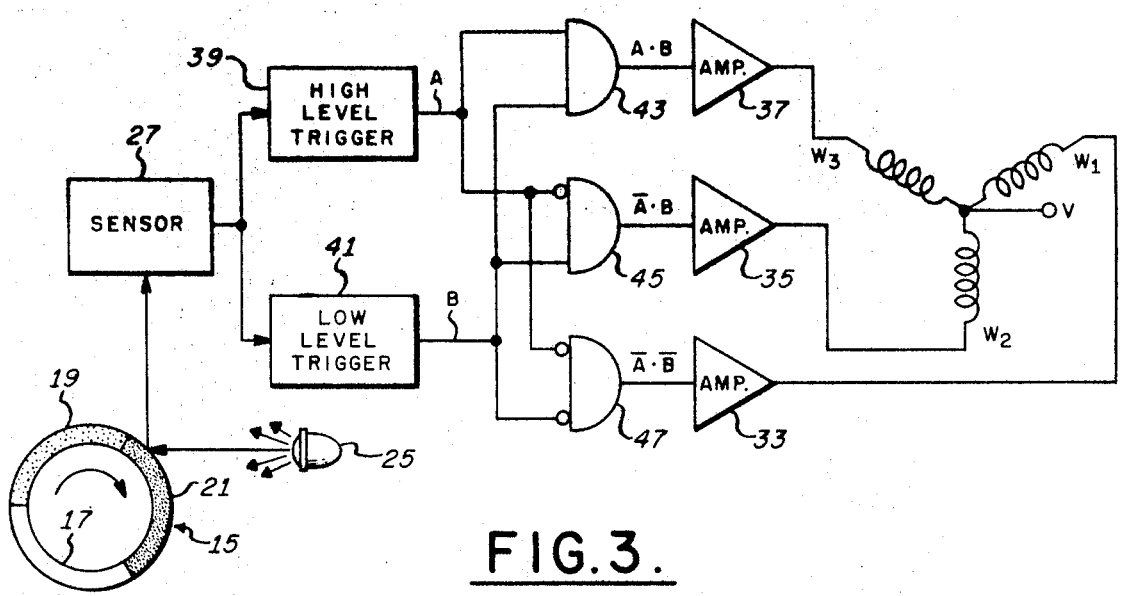
FIG. 3 is a block diagram illustrating a circuit useful in practicing the invention.

The circuits involved in the arrangement of FIG. 2 are shown in more detail in FIG. 3. The attenuating member 15 is indicated as rotating in a clockwise direction and reflects light from the source 25 onto the sensor 27. The level triggers 39 and 41 apply switching signals to the various AND gates 43, 45 and 47. These three AND gates constitute the switching logic. The output from the AND gates is applied through the various amplifiers to the stator windings. One end of each stator winding is connected to a source of voltage V.

Figure 4:
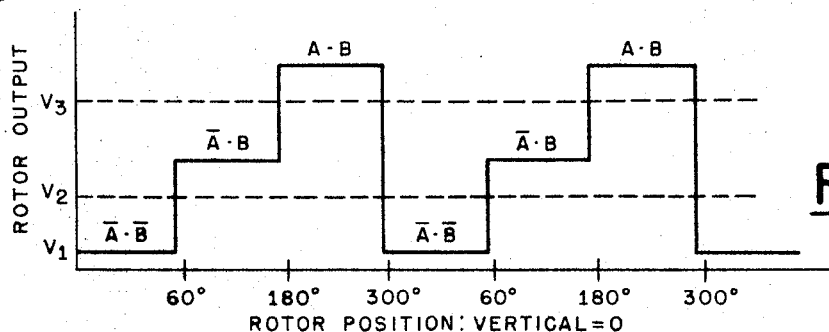
FIG. 4 is a graph useful in explaining the operation of the circuit of FIG. 3.

The operation of the device can be understood by referring to FIGS. 1, 3 and 4. For purposes of illustration, assume that each stator winding is connected so that it will attract the north pole of the rotor 13 when the winding is energized and that clockwise rotation is desired. Assume further that the cylindrical attenuating member 15 of FIG. 1 is oriented as shown in FIG. 3.

Under these conditions, light from the source 25 impinges on the low reflectivity arcuate section 21. The output of the sensor 27 is insufficient to actuate either trigger. With no switching signal from either trigger circuit, the inhibit AND gate 47 produces an output signal that is amplified in the amplifier 33 so as to energize the stator winding $W_1$, and urge the rotor 13 to rotate in the clockwise direction. This condition is pictured in the $\overline{A} \cdot \overline{B}$ section of the graph of FIG. 4. Just before the N-S axis of the rotor 13 becomes aligned with the axis of the stator coil $W_1$, the intermediate reflectivity section 19 of the cylindrical attenuating member 15 enters the path of the light beam. The output of the sensor rises rapidly above the threshold $V_2$ of the low level trigger 41 as shown in the graph of FIG. 4. This trigger now produces an output voltage so that an $\overline{A} \cdot B$ switching voltage is applied to the logic circuit. This causes an output voltage to appear at the inhibit AND gate 45 which is amplified in amplifier 35 so as to energize the stator coil $W_2$, and urge the north pole of the rotor downward in the clockwise direction.

Just before the N-S axis of the $W_2$, becomes aligned with the axis of the stator coil $W_2$, the high reflectivity section 17 enters the path of the light beam. This causes the output of the sensor to rise above the threshold $V_3$ of the high level trigger 39. Both triggers now produce switching signals so that AND gate 43 passes the $A \cdot B$ signal through amplifier 37 so as to energize the winding $W_3$, and urge the north pole of the rotor clockwise towards alignment with the $W_3$ stator coil.

The cycle is completed as the north pole of the rotor passes the winding $W_3$ and the low reflectivity portion 21 of the attenuating member 15 again enters the path of the light beam.

Since any stator coil that is energized is always advanced in the desired direction of rotation, with respect to the rotor position, there is no ambiguity with respect to the direction of rotation. Even on start-up, the initial torque is in the desired direction.

The level triggers 39 and 41 may be any conventional triggers such as Schmitt triggers.

Although AND gates have been shown in the circuits of FIG. 3, these are for purposes of illustration only. It will be appreciated that conventional NAND gate circuits may be preferred in some situations.

As presently preferred, the cylindrical attenuating member contains several sections, each having a unique reflectivity. In some situations, it may be preferable to use different colored sections and color filters in order to establish the different levels required.

Similarly, arcuate sections using different polarizing properties may be utilized if desired.

Although the source and sensor elements have been shown as lying outside the cylindrical attenuating member 15, it will be appreciated that a hollow attenuating member may be provided and both source and sensor may be placed inside this member.

Alternatively, one of these elements may be placed inside the attenuating member and the other outside the attenuating member so that different transmission properties of the arcuate section may be utilized for sensing the position of the rotor.

Figure 5A:
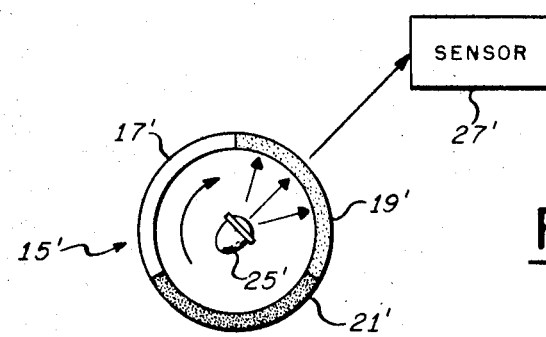
FIG. 5 is a diagram illustrating a transmission-type attenuating means.

Such an embodiment is depicted in FIG. 5. The attenuating member 15' of FIG. 5a includes a high transmissivity segment 17', an intermediate transmissivity segment 19', and a low transmissivity segment 21'. A source of light or other radiant energy 25' is placed within the attenuating member and positioned to radiate energy through the various segments to the sensor 27'. These components may be used with the circuits previously described.

Figure 5B:
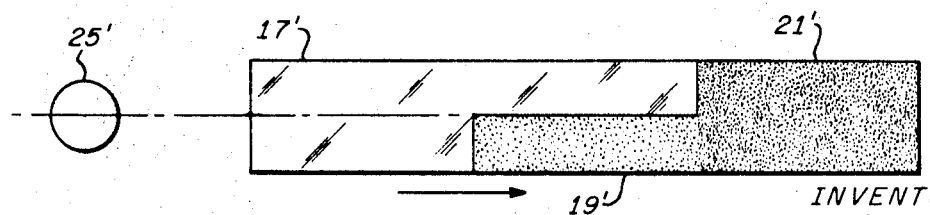

In a preferred embodiment, the transmissive segments function as a variable diaphragm in which predetermined portions of a light beam are blocked as indicated in FIG. 5b. The rectangle in FIG. 5b represents the developed cylindrical surface of the attenuating member 15'. This surface moves over the light source 25' from left to right as indicated by the arrow. The source is positioned on the longitudinal axis of the surface. The high transmissivity segment 17' is transparent and the intermediate transmissivity segment 19' is divided into transparent and opaque areas along the longitudinal axis. When the segment 19' passes over the source 25', half of the beam from the source is blocked and the sensor detects an intermediate energy level. The low transmissivity segment 21' is opaque and permits substantially none of the energy from the source to pass.

In certain situations, some instability may occur in the region between the low attenuation segment and the high attenuation segment.

Referring to FIG. 4, for instance, assume that the rotor has come to rest at a position slightly less than 300°. When the motor is again energized, part of the energy will pass through the low attenuation segment of the attenuating member and part through the high attenuation segment. The sensor may interpret this as an intermediate segment so as to cause rotation back toward the 180° position. A slight rotation then causes the low attenuation segment to move across the beam so as to reverse the direction of rotation. Under certain circumstances, this can set up an oscillatory condition.

Such situations can be avoided by providing suitable hysteresis in the level triggers; that is, by designing level detectors in which the triggers switch on at a unique energy level, but remain on until a lower level is reached.

Numerous methods for accomplishing this are well known in the art. P. A. Francis and K. R. Whittington, for instance, described such a circuit in an article entitled "Low Cost Schmitt Trigger Made with IC" appearing on pages 88—89 of Electronics Magazine for Mar. 4, 1968. In this circuit, an input signal such as the signal from the sensor 27 actuates a Schmitt trigger. The amount of hysteresis may be selected by means of a potentiometer adjustment.

Applying these principles to the level triggers 39 and 41, sufficient hysteresis would be employed to hold the level triggers on until the energy reaching the sensor has been reduced to the lowest energy level. Thus, in passing clockwise through the 300° position of FIG. 4, the signals from the various gates of FIG. 3 would pass directly from the A · B condition to the $\overline{A}$ · $\overline{B}$ condition without passing through the intermediate $\overline{A}$ · B condition.

The description of the motor has been limited to optical commutation. It will be appreciated that other forms of energy such as radioactive or electromagnetic sources may be employed together with the corresponding attenuating and sensing means if desired.

The motor has been described as having three stator coils. However, the principles of the invention may be applied to motors containing any convenient number of stator coils. The maximum number of stator coils is limited in the practical sense, by the number of unique levels of attenuation that can be distinguished.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A brushless DC motor comprising a permanent magnet rotor rotatable about an axis, said rotor containing a pair of magnetic poles; a plurality of three stator coils spaced at equiangular intervals around said axis, each of said coils being energizable to attract the same specified magnetic pole of said rotor; a stationary light source; a stationary photosensor; cylindrical attenuating means rotatable with said rotor for limiting the level of energy reaching said photosensor from said source; said cylindrical attenuating means being mounted coaxially on said rotor and positioned so that some portion of its cylindrical surface is in the path of the energy propagating between said source and said photosensor; a plurality of three arcuate segments disposed around the periphery of the cylindrical attenuating means, each segment corresponding to a given stator coil and providing low, intermediate and high degrees of attenuation respectively, each of said segments being positioned so that successive segments are exposed to the energy from said source as the rotor rotates, said segments being further positioned so that a change in attenuation is accomplished just before said specified magnetic poles become aligned with the axis of a stator coil; level detection means including first and second trigger means; said first trigger means being adjusted to produce a switching signal when the sensor receives light from any but said high attenuation arcuate section, said second trigger means being adjusted to produce a switching signal only when the sensor receives light from said low attenuation arcuate section; and switching means including logic means for energizing the first of the stator coils when neither trigger means produces a switching signal, the second of the stator coils when only the first trigger means produces a switching signal, and the third of the stator coils when both trigger means produce switching signals.

2. The apparatus of claim 1 wherein the source and photosensor are positioned so that light is reflected from said segments, said segments having low, intermediate and high degrees of reflectivity respectively.

3. The apparatus of claim 1 wherein the source and photosensor are positioned so that light passes through said segments, said segments having low, intermediate and high degrees of opacity respectively.